US012711789B2

(12) United States Patent
Arcadu et al.

(10) Patent No.: US 12,711,789 B2
(45) Date of Patent: Aug. 18, 2026

(54) ORGAN IDENTIFICATION USING AI

(71) Applicant: Hoffmann-La Roche Inc., Little Falls, NJ (US)

(72) Inventors: Filippo Arcadu, Basel (CH); Citlalli Gamez Serna, Basel (CH); Fernando Romero Palomo, Basel (CH)

(73) Assignee: Hoffmann-La Roche Inc., Little Falls, NJ (US)

( * ) Notice: Subject to any disclaimer, the term of this patent is extended or adjusted under 35 U.S.C. 154(b) by 284 days.

(21) Appl. No.: 18/294,059

(22) PCT Filed: Aug. 10, 2022

(86) PCT No.: PCT/EP2022/072430

§ 371 (c)(1),
(2) Date: Jan. 31, 2024

(87) PCT Pub. No.: WO2023/017074

PCT Pub. Date: Feb. 16, 2023

(65) Prior Publication Data

US 2024/0331415 A1 Oct. 3, 2024

(30) Foreign Application Priority Data

Aug. 11, 2021 (EP) .................................... 21190786

(51) Int. Cl.
*G06V 20/69* (2022.01)
*G06V 10/774* (2022.01)
(Continued)

(52) U.S. Cl.
CPC .......... *G06V 20/698* (2022.01); *G06V 10/774* (2022.01); *G06V 10/776* (2022.01);
(Continued)

(58) Field of Classification Search
CPC .. G06V 20/698; G06V 10/774; G06V 10/776; G06V 10/806; G06V 10/82;
(Continued)

(56) References Cited

U.S. PATENT DOCUMENTS

2019/0295252 A1* 9/2019 Fuchs ................ G06V 10/7635
2020/0250398 A1* 8/2020 Courtiol ................ G06V 10/82
(Continued)

OTHER PUBLICATIONS

Khorshed, Tarek, Mohamed N. Moustafa, and Ahmed Rafea. "Multi-tissue cancer classification of gene expressions using deep learning." 2020 IEEE Sixth International Conference on Big Data Computing Service and Applications (BigDataService). IEEE, 2020. (Year: 2020).*
(Continued)

*Primary Examiner* — Henok Shiferaw
(74) *Attorney, Agent, or Firm* — MORRISON & FOERSTER LLP

(57) ABSTRACT

A computer-implemented method of identifying a tissue type in digital histological images of human or animal tissue comprises training a convolutional neural network (CNN) to identify a particular target tissue type in a plurality of training data sets of digital histological images, inputting a test data set of digital histological images into the trained CNN, and receiving as an output result of the CNN a probability value that the inputted test data set corresponds to the target tissue type. A training procedure of the CNN comprises performing with training data sets: selecting a target tissue area of the training data set, dividing the target tissue area into different sets of tiles of constant size but having different image magnifications, and inputting the sets of tiles into a multi-headed CNN, wherein the sets of tiles having different image magnifications are processed in parallel and the features of the sets of tiles are concatenated.

11 Claims, 9 Drawing Sheets

1000

(51) Int. Cl.
*G06V 10/776* (2022.01)
*G06V 10/80* (2022.01)
*G06V 10/82* (2022.01)
*G06V 20/70* (2022.01)

(52) U.S. Cl.
CPC ............ *G06V 10/806* (2022.01); *G06V 10/82* (2022.01); *G06V 20/695* (2022.01); *G06V 20/70* (2022.01); *G06V 2201/031* (2022.01)

(58) Field of Classification Search
CPC ................. G06V 20/695; G06V 20/70; G06V 2201/031; G06V 10/454; G06V 10/50; G06V 10/75; G06T 5/60
See application file for complete search history.

(56) References Cited

U.S. PATENT DOCUMENTS

| | | | | |
|---|---|---|---|---|
| 2021/0192732 | A1* | 6/2021 | Al-Qaisi | G06T 7/13 |
| 2021/0327061 | A1* | 10/2021 | Clymer | G06V 20/69 |
| 2022/0084660 | A1* | 3/2022 | Georgescu | G16H 30/40 |
| 2024/0037747 | A1* | 2/2024 | Raedt | G06N 3/09 |

OTHER PUBLICATIONS

EPO, International Search Report for International Patent Application No. PCT/EP2022/072430, Nov. 28, 2022, 3 pages.
EPO, Written Opinion for International Patent Application No. PCT/EP2022/072430, Nov. 28, 2022, 6 pages.
Wetteland, Rune et al., “A Multiscale Approach for Whole-Slide Image Segmentation of five Tissue Classes in Urothelial Carcinoma Slides,” Technology in Cancer Research and Treatment, vol. 19, Jan. 1, 2020, pp. 1-15.
Anonymous, “Data augmentation—Wikipedia,” retrieved from Internet: https://en.wikipedia.org/w/index.php?title=Data_augmentation&oldid=1029174861, Jun. 18, 2021, 4 pages.
Hoefling, H. et al. (2021). “HistoNet: A Deep Learning-Based Model of Normal Histology,” Toxicologic Pathology 49 (4):784-797.
International Preliminary Report on Patentability, issued Feb. 13, 2024, for PCT Application No. PCT/EP2022/072430, filed Aug. 10, 2022, 7 pages.

* cited by examiner

Obtain training data set of digital images

110

Selecting a target tissue area of the training data set

120

Dividing the target tissue area into N different sets of tiles of constant size but with different image magnifications

130

Processing the N sets of tiles in parallel in N-headed CNN

Features of the N sets of tiles are concatenated

140

Labelling the output result of the CNN with respect to the target tissue type

150

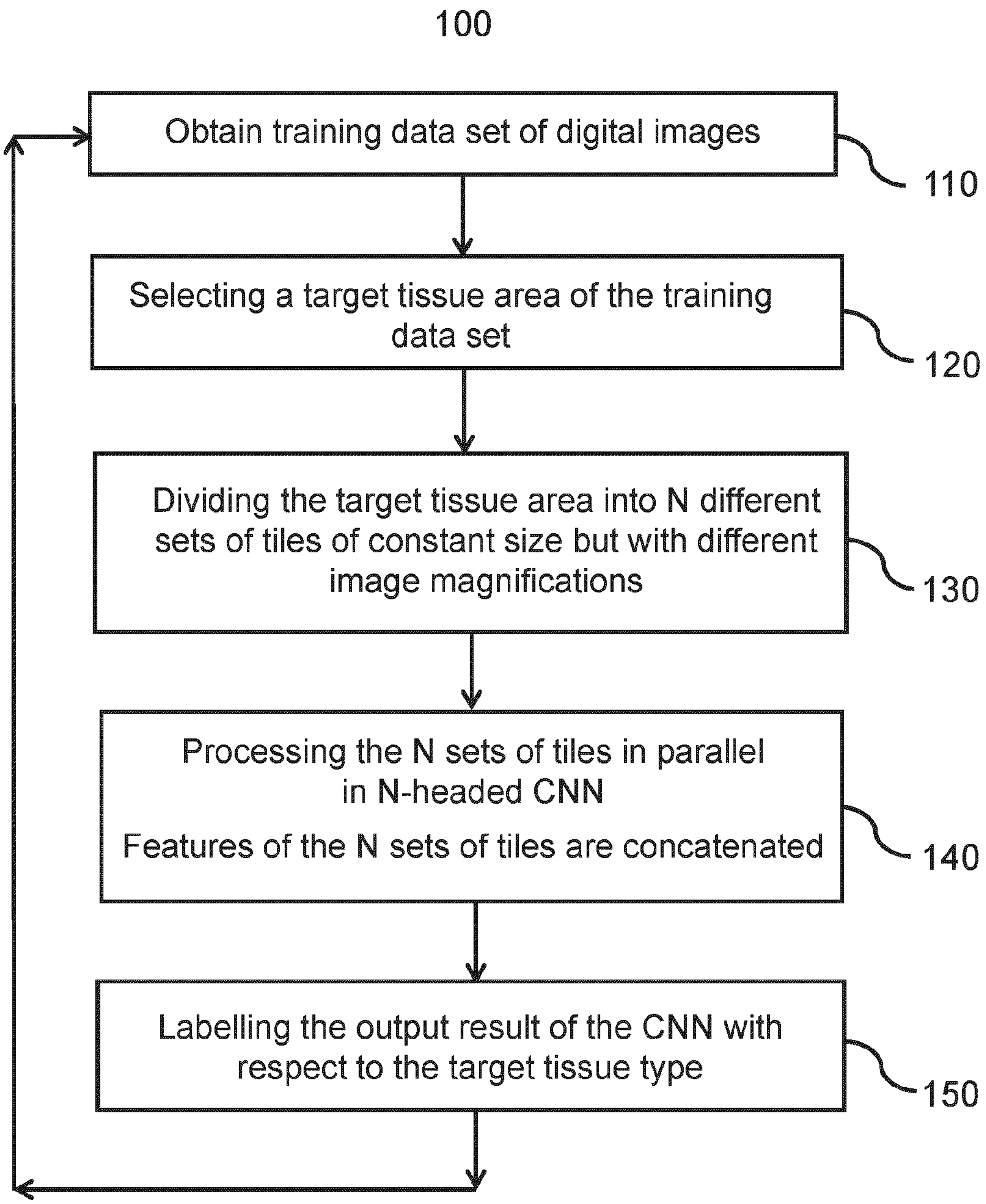

ORGAN IDENTIFICATION USING AI

CROSS-REFERENCE TO RELATED APPLICATIONS

This application is a U.S. National Stage filing under 35 U.S.C. § 371 of International Patent Application No. PCT/EP2022/072430, filed Aug. 10, 2022, which in turn claims priority under PCT Article 8 and/or 35 U.S.C. § 119 (a) to and the benefit of European Patent Application No. EP21190786.0, filed on Aug. 11, 2021. The disclosures of European Patent Application No. EP21190786.0 and International Patent Application No. PCT/EP2022/072430 are hereby incorporated by reference herein in their entirety for all purposes.

TECHNICAL FIELD

The present application generally relates to the field of computational pathology and in particular to the identification of organs or tissue types using artificial intelligence (AI).

BACKGROUND

Computational pathology describes an approach to diagnosis incorporating multiple sources of digital data. A key element of the approach is the ability to derive data from histopathology images as for example whole-slide imaging (WSI) of stained tissue sections. It has been shown (Holger Hoefling et al., "*HistoNet: A Deep Learning-Based Model of Normal Histology*", Toxicologic Pathology 2021, Vol. 49(4) 784-797) that a comprehensive set of tissues can be recognized by standard convolutional neural networks (CNNs) trained on small images or patches extracted at various magnifications from H&E-stained WSI of a diversity of rat tissues.

It is desirable to identify samples from digital pathology images, in particular WSI images, e.g. for the purpose of quality control in preclinical working environments. In some cases samples of different organs are grouped together in the same image. In these cases a reliable automated identification of tissue of different organs in the image by using artificial intelligence methods would be particularly advantageous.

The present invention is directed to provide improved methods for tissue type and/or organ identification in digital histological images of human or animal tissue.

SUMMARY

A simplified summary of some embodiments of the disclosure are provided in the following to give a basic understanding of these embodiments and their advantages. Further embodiments and technical details are described in the detailed description presented below.

According to an embodiment, a computer-implemented method of identifying a tissue type in digital histological images of human or animal tissue comprises training a convolutional neural network to identify a particular target tissue type in a plurality of training data sets of digital histological images of human or animal tissue, inputting a test data set of digital histological images of human or animal tissue into the trained convolutional neural network, receiving as an output result of the convolutional neural network a probability value that the inputted test data set corresponds to the target tissue type. The training of the convolutional neural network comprises performing with the plurality of training data sets of digital histological images of human or animal tissue the steps of selecting a target tissue area of a training data set, dividing the target tissue area into a first set of tiles of constant size and having a first image magnification, dividing the target tissue area into at least a second set of tiles of constant size and having a second image magnification different from the first image magnification, inputting the at least two sets of tiles into the convolutional neural network, wherein the convolutional neural network is an at least two-headed convolutional neural network in which the at least two sets of tiles are processed in parallel and whereby the features of the at least two sets of tiles are concatenated, and labelling the output results of the convolutional neural network with respect to the target tissue type. This method allows an improved identification of different tissue types.

In some embodiments the bit size of all sets of tiles are identical, for example 224×224×3 pixels.

In some embodiments the centroids of the different sets of tiles are identical.

In some embodiments the training data sets and test data sets of digital histological images of human or animal tissue are whole slide images (WSI).

In some embodiments the identified different tissue types are tissues of different organs.

In some embodiments dividing the target tissue area into the extraction of the at least two tile sets comprises extracting a foreground mask of the tissue region, providing annotations classifying areas of the tissue region, and merging the annotations with the foreground mask. This procedure provides a reliable method of dividing the target tissue area into standardized tiles.

In some embodiments the at least two different sets of tiles correspond to image magnification factors of 1.25, 5, and 10.

Some embodiments comprise applying a binary training model for identification of a particular tissue type or organ.

In some embodiments the training procedure of the convolutional neural network comprises random horizontal and/or vertical flips of the tiles.

In some embodiments the training procedure of the convolutional neural network comprises variations of the color, hue, saturation, brightness and/or contrast of the tile images.

BRIEF DESCRIPTION OF THE DRAWINGS

The foregoing summary as well as the following detailed description of preferred embodiments are better understood when read in conjunction with the append drawings. For illustrating the invention, the drawings show exemplary details of systems, methods, and experimental data. The information shown in the drawings are exemplary and explanatory only and are not restrictive of the invention as claimed. In the drawings:

FIG. 2 shows a flow chart illustrating an embodiment of a method of training a convolutional neural network of the identification method of FIG. 1;

DETAILED DESCRIPTION

Figure 3:
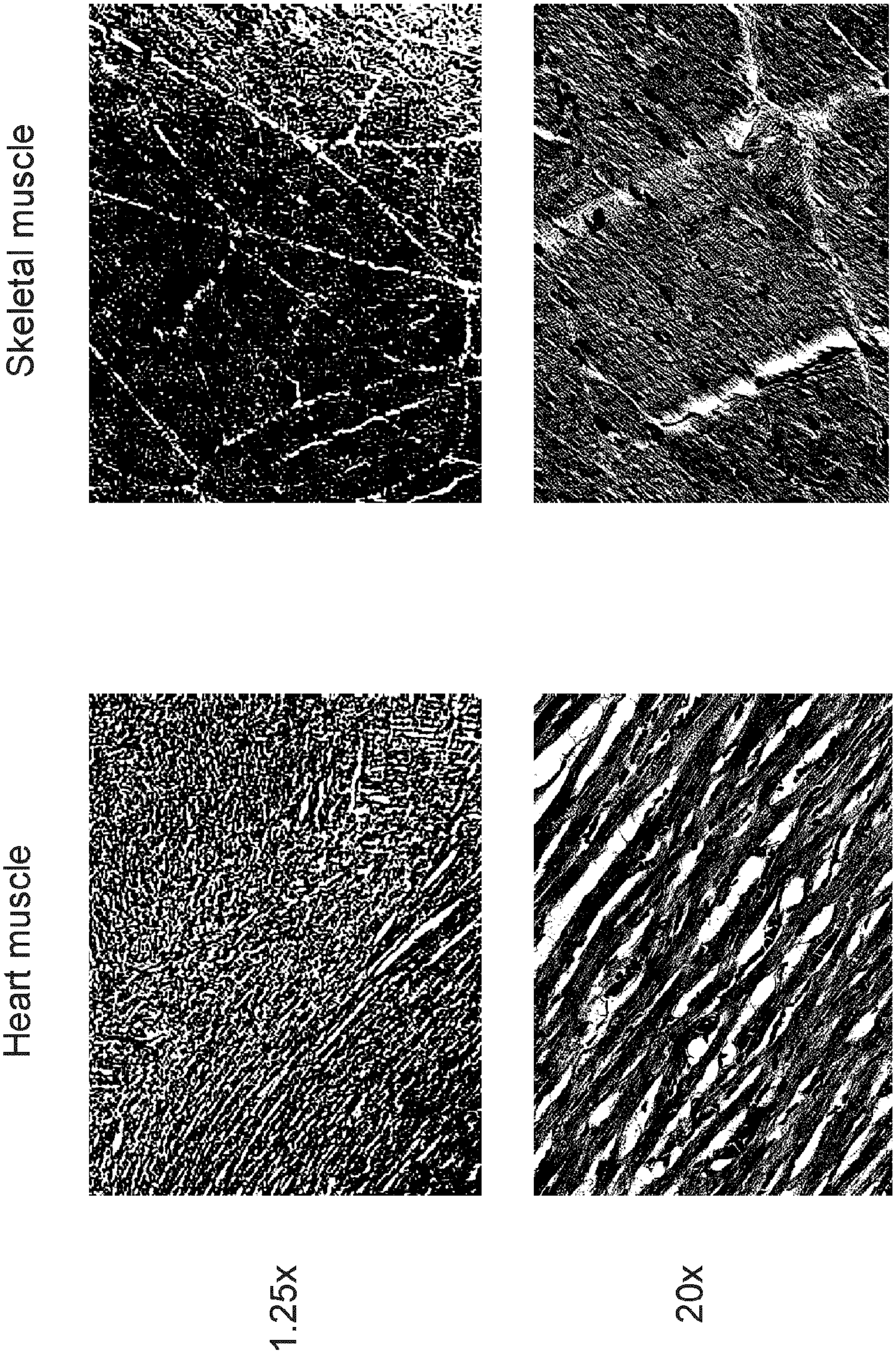
FIG. 3 shows exemplary images of different tissue types at different magnifications.

The reliable automated identification of different tissue types and in particular the identification of organs in pathological images is highly desirable for different preclinical working environments. This identification of different organs or tissue types depends on the magnification of the digital histologic images as for example the WSI images. While some organs show characteristic structures at low image magnifications of e.g. 1.25×, other organs can be best identified at higher magnifications such as 5× or 10×. This is illustrated in FIG. 3, which shows an example of whole slides images (WSI) of two different tissue types (heart muscle and skeletal muscle tissue) at two different magnifications, namely 1.25× and 20×. While the tissue structure of both muscle tissue types looks very similar at the lower magnification of 1.25×, the structural differences are more prominent at the larger magnification of 20×. Consequently, an automated tissue identification using a machine learning model will obtain better results distinguishing heart muscle tissue from skeletal muscle tissue at the higher image magnification level than at the lower magnification level. This relation, however, cannot be generalized. For some tissue types the identification is easier at lower magnification, e.g. because more "context" is visible in the images of lower magnification.

The present invention therefore proposes to train a convolutional neural network (CNN) for tissue type identification using different image magnifications in parallel. In particular, a computer-implemented method of identifying a tissue type in data sets of digital histological images using a training procedure of a convolutional neural network comprises performing with a plurality of training data sets the steps of selecting a target tissue area of the training data set, dividing the target tissue area into a different sets of tiles of constant size but having different image magnifications, and inputting the sets of tiles into a multi-headed convolutional neural network, wherein the sets of tiles having different image magnifications are processed in parallel and the features of the sets of tiles are concatenated. With this training procedure the tissue type or organ identification accuracy can be improved since tissue features more characteristic at lower magnifications as well as those more characteristic at higher magnifications contribute to the learning procedure of the convolutional neural network. Preferably, the selection of the number of different tile sets and their respective image magnifications can be adapted and optimized to the respective target tissue or target organ.

Figure 1:
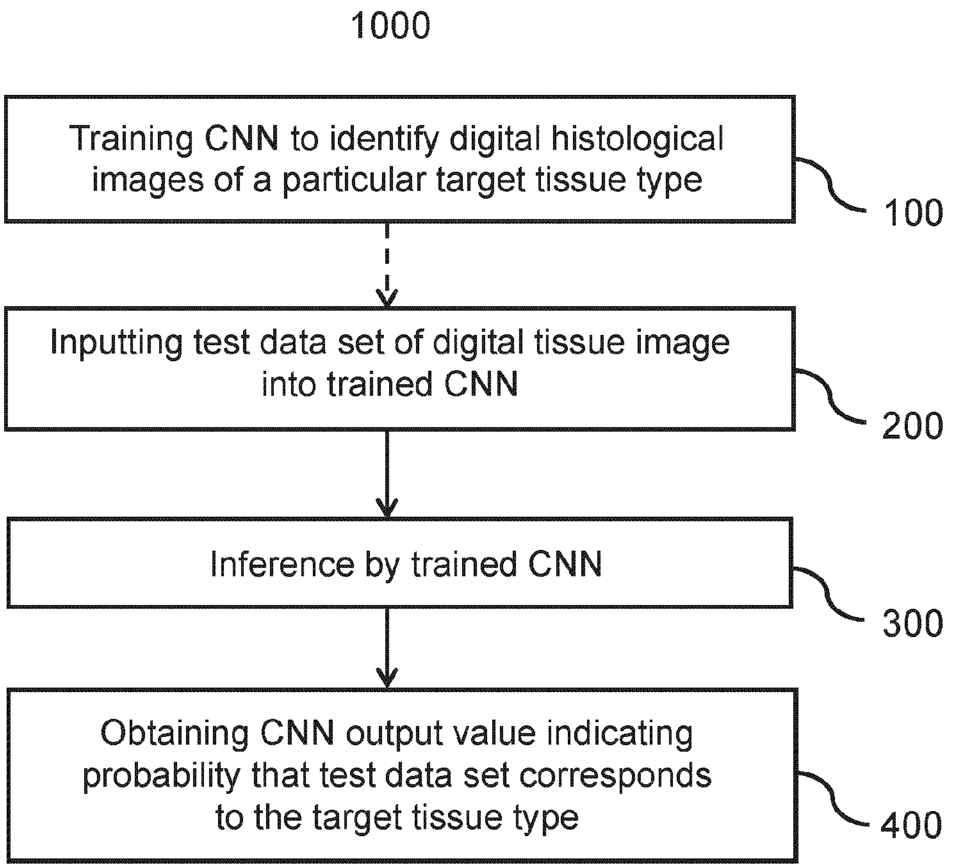
FIG. 1 shows a flow chart illustrating an embodiment of a computer-implemented method of identifying a tissue type in data sets of digital histological images.

FIG. 1 is a flow chart illustrating an embodiment of a computer-implemented method 1000 of identifying a tissue type in data sets of digital histological images, for example WSI images. These are available in large numbers in archives for example for rat samples. In a first step 100 a convolutional neural network CNN is trained to identify images of a particular target tissue type. e.g. a particular organ as for example liver, kidney, or salivary gland. The procedure of training the neural network is in more detail explained later with reference to FIGS. 2 and 4. In a second step 200 of the identification method a test data set also preferably consisting of WSI images is input into the trained CNN, which performs the inference in subsequent method step 300. In step 400 a result is obtained which provides a probability that the input test data set shows tissue of the target tissue type, for example liver tissue.

Figure 6:
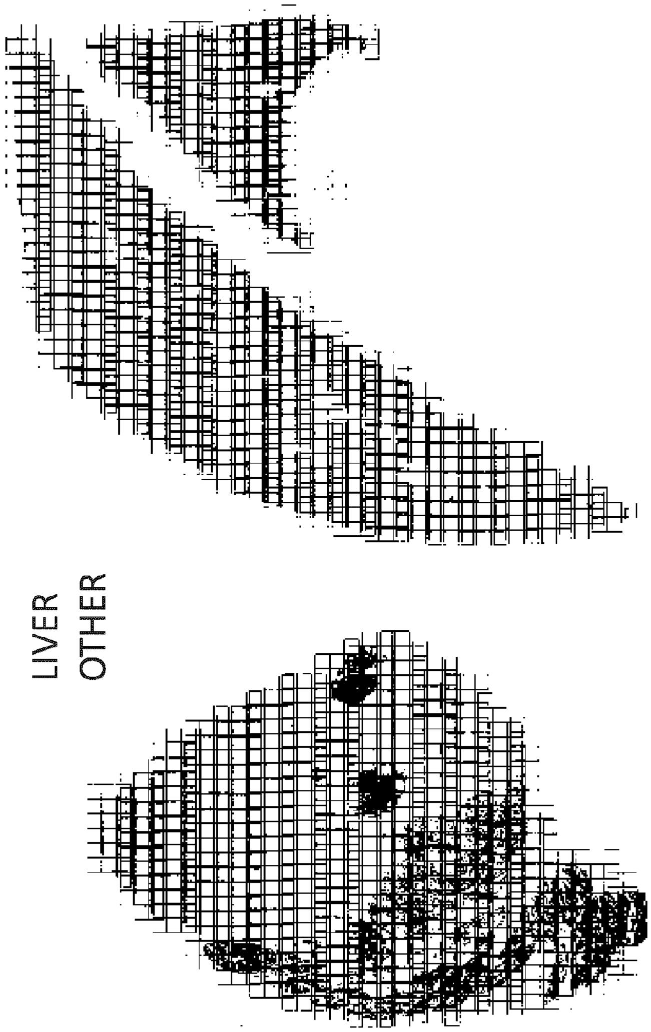
FIG. 6 is a schematic illustration of dividing a WSI image into different sets of tiles.
Figure 7:
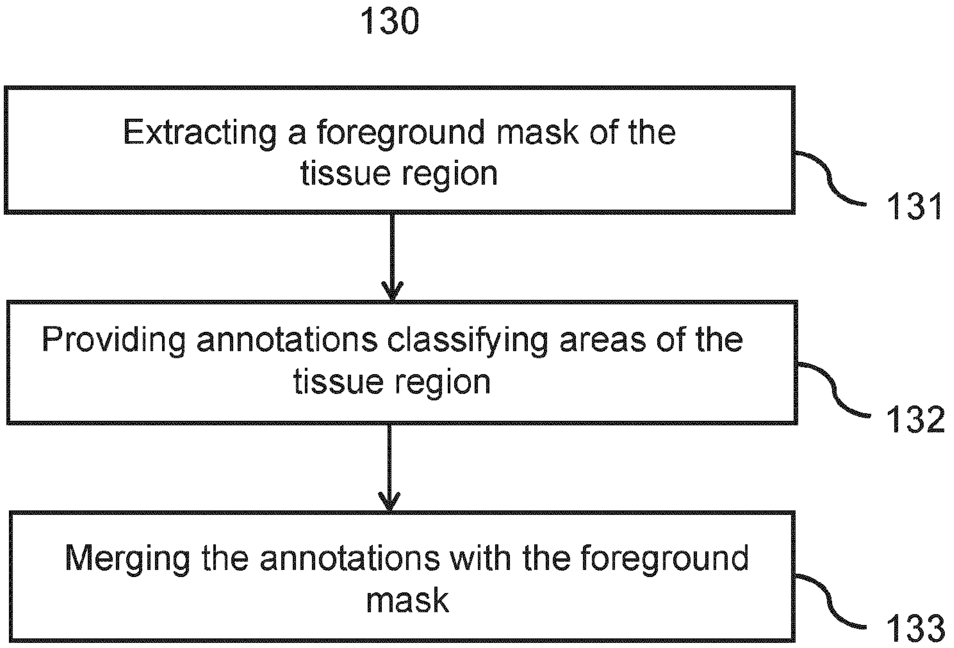
FIG. 7 shows a flow chart illustrating an embodiment of a method of dividing a target tissue area into a plurality of tile sets of the identification method of FIG. 1.

FIG. 2 is a flow chart illustrating an embodiment of a method of training the CNN referred to in FIG. 1. In a first step 110 a training data set of digital images, preferably WSI images, is obtained. In a second step 120 a target tissue area is selected for the training procedure by means of manual annotations. In the subsequent method step 130 the target tissue area is divided into different sets of tiles as illustrated in FIG. 6. Each tile preferably has a constant pixel size of e.g. 224×224×3 pixels. Standardization of the tile size and format can improve the accuracy of organ detection. The selected target tissue area is divided into at least two different sets of tiles of constant pixel size but of different image magnification. The target area is thus for example divided into a first set of tiles (of e.g. 224×224×3 pixels) having an image magnification of 1.25, a second set of tiles (of also 224×224×3 pixels) having an image magnification of 5, and a third set of tiles (of 224×224×3 pixels) having an image magnification of 10. The number of tile sets and the magnification levels can be selected depending on the specific target tissue or organ to which the CNN is to be trained for.

Figure 4:
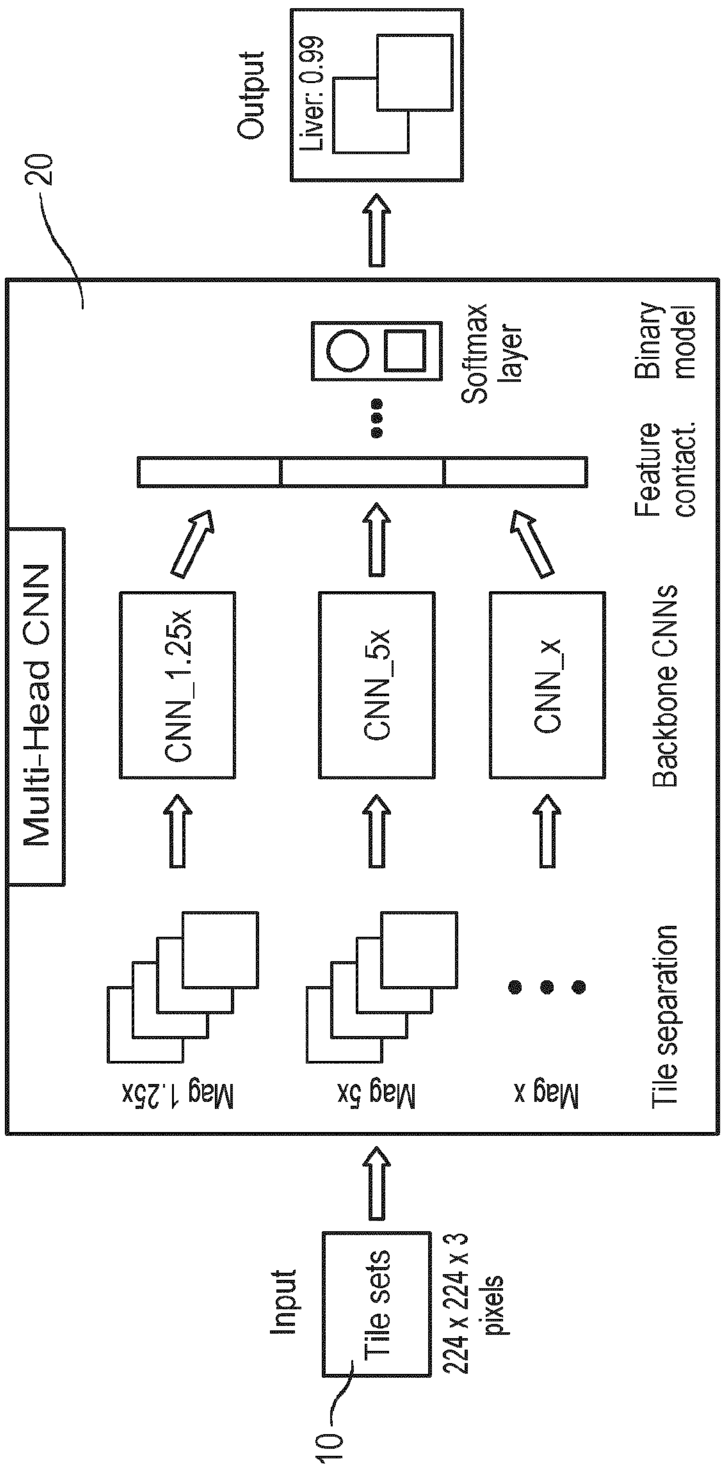
FIG. 4 is a schematic illustration of an embodiment of a convolutional neural network for use with identification method of FIG. 1.

In the next step 140 (FIG. 2) of the training procedure the N (typically 2 or 3) sets of tiles are submitted to the input of an N-headed CNN. Thus, the data sets based on different image magnifications are processed in parallel and the features of the N sets of tiles are concatenated. An embodiment of a corresponding CNN is schematically illustrated in FIG. 4. The tile sets 10 are input into the multi-head CNN 20, which processes the tile sets of different magnification in parallel using separate backbone CNNs. The features are concatenated and an output result is delivered at an output. If a binary model is used, a binary labelling is performed during the training procedure, i.e. labeling "yes" or "no" with respect to a target organ like a liver (step 150 in FIG. 2).

Figure 5:
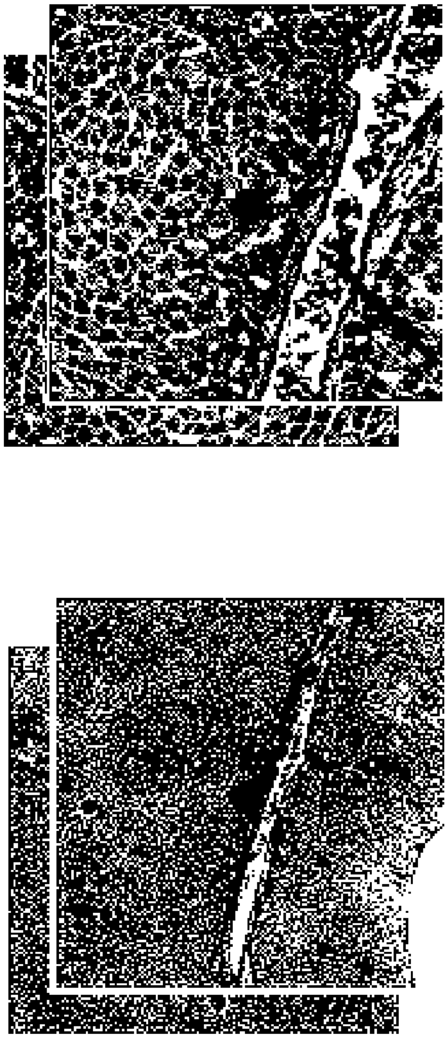
FIG. 5 is a schematic illustration of exemplary tiles showing tissue areas at different magnifications.
Figure 8:
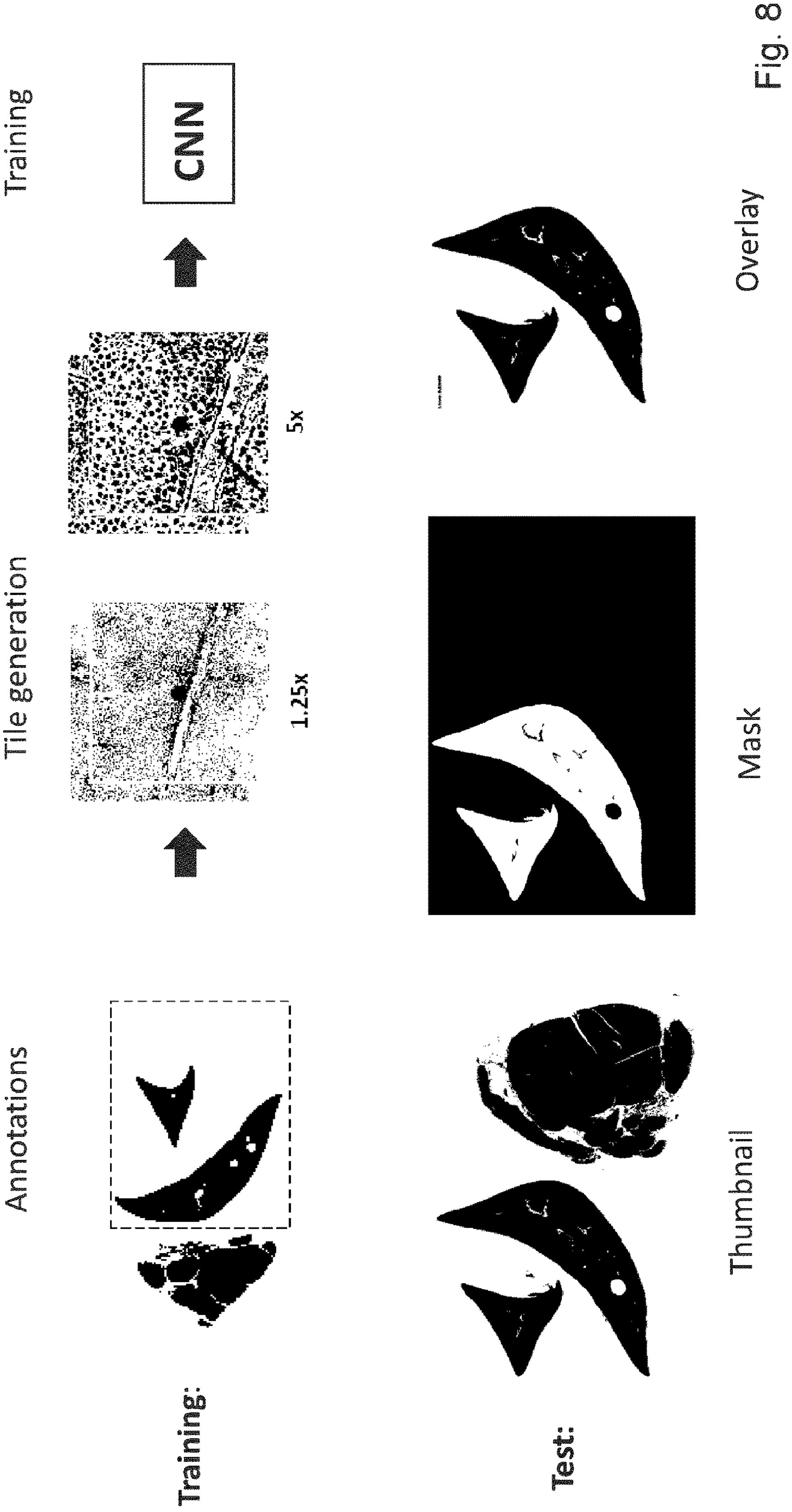
FIG. 8 illustrates a training and a test procedure in an embodiment of the identification method of FIG. 1.

The method step 130 (FIG. 2) of dividing a target tissue area into sets of tiles is now explained in connection with FIGS. 5 to 8. In a first step 131 (FIG. 7) a foreground mask of the tissue region (liver) is extracted as illustrated in FIG. 8. In step 132 annotations classifying areas of the tissue region are provided and an overlay or merge of the foreground mask with the annotations is performed (step 133 in FIG. 7 and bottom-right image in FIG. 8). The obtained tile sets are illustrated in FIG. 6. These comprise tiles showing only part of the target tissue type as the liver and tiles covering boundary regions containing both liver tissue and non-liver tissue. Preferably the different tile sets representing different image magnifications have the same centroid as illustrated in FIG. 5 showing the centroid as a red dot.

in order to improve the robustness of the organ detection, different augmentation techniques can be applied for the training procedure including random horizontal of vertical flip of the tiles, random color augmentation and/or variation of hue, saturation, brightness, and contrast of the tile image.

Figure 9:
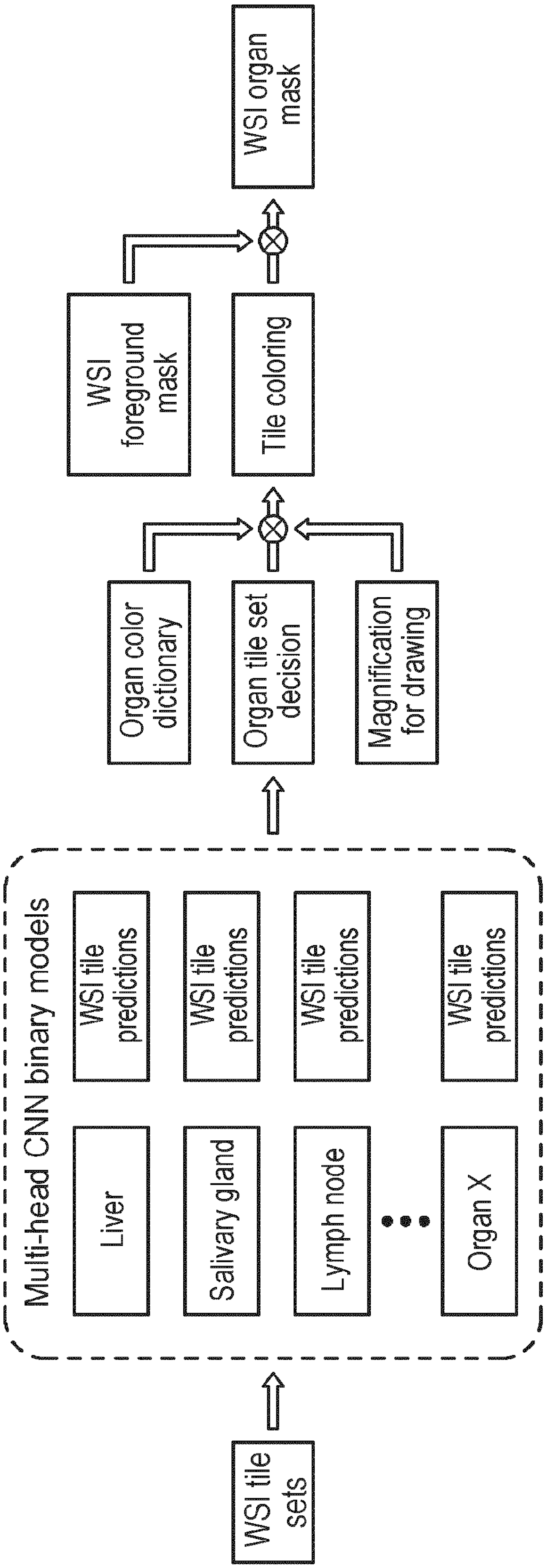
FIG. 9 is a schematic block diagram illustrating applications of the identification method according to FIGS. 1-8.

FIG. 9 schematically illustrates a procedure of obtaining WSI organ masks. Based on WSI tile sets binary identification models of different types of organs and tissue types can be obtained by training multi-headed CNNs. With the obtained tile set decision (identification) and an organ color dictionary and selecting a drawing magnification a tile coloring can be obtained, which in turn can be combined with a WSI foreground mask to obtain a WSI organ mask.

Applications of the identification methods are numerous. Based on WSI image tile sets, binary identification models of different types of organs and tissue types can be obtained by training multi-headed CNNs. These include the liver, salivary gland, lymph nodes, kidney, urinary bladder, etc. but also for example different muscle types or models directed to distinguish between thyroid and parathyroid glands.

Aspects of this disclosure including the CNN can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

Unless otherwise stated, the foregoing alternative examples are not mutually exclusive, but may be implemented in various combinations to achieve unique advantages. In the foregoing description, the provision of the examples described, as well as clauses phrased as "such as," "including" and the like, should not be interpreted as limiting embodiments to the specific examples; rather, the examples are intended to illustrate only one of many possible embodiments.

This disclosure furthermore includes the following examples:

1. A computer-implemented method of identifying a tissue type in digital histological images of human or animal tissue, the method comprising: training a convolutional neural network to identify a particular target tissue type in a plurality of training data sets of digital histological images of human or animal tissue, inputting a test data set of digital histological images of human or animal tissue into the trained convolutional neural network, receiving as an output result of the convolutional neural network a probability value that the inputted test data set corresponds to the target tissue type, wherein the training of the convolutional neural network comprises performing with the plurality of training data sets of digital histological images of human or animal tissue the steps of: selecting a target tissue area of a training data set, dividing the target tissue area into a first set of tiles of constant size and having a first image magnification, dividing the target tissue area into at least a second set of tiles of constant size and having a second image magnification different from the first image magnification, inputting the at least two sets of tiles into the convolutional neural network, wherein the convolutional neural network is an at least two-headed convolutional neural network in which the at least two sets of tiles are processed in parallel whereby the features of the at least two sets of tiles are concatenated, and labelling the output results of the convolutional neural network with respect to the target tissue type.

2. The method of example 1, wherein the size of the tiles of all sets of tiles are identical.

3. The method of example 1 or 2, wherein the centroids of the different sets of tiles are identical.

4. The method of one of the preceding examples, wherein the training data sets and test data sets of digital histological images of human or animal tissue are whole slide images.

5. The method of one of the preceding examples, wherein the identified different tissue types are tissues of different organs.

6. The method of one of the preceding examples, wherein dividing the target tissue area into the at least two tile sets comprises: extracting a foreground mask of the tissue region, providing annotations classifying areas of the tissue region, and merging the annotations with the foreground mask.

7. The method of one of the preceding examples, wherein the at least two different sets of tiles correspond to image magnification factors of 1.25, 5, and 10.

8. The method of one of the preceding examples, comprising applying a binary training model for annotation of a particular tissue type.

9. The method of one of the preceding examples, wherein the training procedure of the convolutional neural network comprises random horizontal and/or vertical flips of the tiles.

10. The method of one of the preceding examples, wherein the training procedure of the convolutional neural network comprises variations of the color, hue, saturation, brightness and/or contrast of the tile images.

11. A computer program comprising computer-readable instructions which when executed by a data processing system cause the data processing system to carry out the method according to any one of the methods of examples 1-10.

12. A recording medium readable by a computer and having recorded thereon a computer program including instructions for executing the stops of a method according to any one of the methods of examples 1-10.

13. A processing device comprising a storage unit having stored thereon a trained convolutional neural network as defined in any one of the methods of examples 1-10.

The invention claimed is:

1. A computer-implemented method of identifying a tissue type of an organ in digital histological images of human or animal tissue, the method comprising:

training a convolutional neural network to identify a particular target organ tissue type in a plurality of training data sets of digital histological images of human or animal tissue;

inputting a test data set of digital histological images of human or animal tissue into the trained convolutional neural network; and receiving as an output result of the convolutional neural network a probability value that the inputted test data set corresponds to the target organ tissue type, wherein the training of the convolutional neural network comprises:

selecting a target organ tissue area of a training data set of the plurality of training data sets;

dividing the target organ tissue area into a first set of tiles of constant size and having a first image magnification and dividing the target organ tissue area into at least one second set of tiles of constant size and having a second image magnification different from the first image magnification, wherein dividing the target organ tissue area into the first set of tiles and the at least one second set of tiles comprises:

extracting a foreground mask of the target organ tissue area;

providing annotations classifying areas of the target organ tissue area; and merging the annotations with the foreground mask;

inputting the first set of tiles and the at least one second set of tiles into the convolutional neural network, wherein the convolutional neural network is an at least two-headed convolutional neural network in which the first set of tiles and the at least one second set of tiles are processed in parallel whereby features of the first set of tiles and the at least one second set of tiles are concatenated; and labelling output results of the convolutional neural network with respect to the target organ tissue type.

2. The method of claim 1, wherein the size of the tiles of all the sets of tiles are identical.

3. The method of claim 1, wherein one or more centroids of the first set of tiles and the at least one second set of tiles are identical.

4. The method of claim 1, wherein the training data sets and test data set of digital histological images of human or animal tissue are whole slide images.

5. The method of claim 1, wherein the target organ tissue type is one of identified tissue types for tissues of different organs.

6. The method of claim 1, wherein the first set of tiles and the at least one second set of tiles correspond to image magnification factors of 1.25, 5, and 10.

7. The method of claim 1, further comprising applying a binary training model for annotation of the target organ tissue type.

8. The method of claim 1, wherein the training of the convolutional neural network comprises random horizontal and/or vertical flips of the first set of tiles and the at least one second set of tiles.

9. The method of claim 1, wherein the training of the convolutional neural network comprises training the convolutional neural network with variations of one or more of a color, hue, saturation, brightness and/or contrast of at least one of the first set of tiles and the at least one second set of tiles.

10. A non-transitory recording medium readable by a computer and having recorded thereon a computer program including instructions for:

training a convolutional neural network to identify a particular target organ tissue type in a plurality of training data sets of digital histological images of human or animal tissue;

inputting a test data set of digital histological images of human or animal tissue into the trained convolutional neural network; and receiving as an output result of the convolutional neural network a probability value that the inputted test data set corresponds to the target organ tissue type, wherein the training of the convolutional neural network comprises:

selecting a target organ tissue area of a training data set of the plurality of training data sets;

dividing the target organ tissue area into a first set of tiles of constant size and having a first image magnification and dividing the target organ tissue area into at least one second set of tiles of constant size and having a second image magnification different from the first image magnification, wherein dividing the target organ tissue area into the first set of tiles and the at least one second set of tiles comprises:

extracting a foreground mask of the target organ tissue area;

providing annotations classifying areas of the target organ tissue area; and merging the annotations with the foreground mask;

inputting the first set of tiles and the at least one second set of tiles into the convolutional neural network, wherein the convolutional neural network is an at least two-headed convolutional neural network in which the first set of tiles and the at least one second set of tiles are processed in parallel whereby features of the first set of tiles and the at least one second set of tiles are concatenated; and labelling output results of the convolutional neural network with respect to the target organ tissue type.

11. A processing device comprising a storage unit having stored thereon instructions causing the processing device to:

train a convolutional neural network to identify a particular target organ tissue type in a plurality of training data sets of digital histological images of human or animal tissue;

input a test data set of digital histological images of human or animal tissue into the trained convolutional neural network; and receive as an output result of the convolutional neural network a probability value that the inputted test data set corresponds to the target organ tissue type, wherein the training of the convolutional neural network comprises:

selecting a target organ tissue area of a training data set of the plurality of training data sets;

dividing the target organ tissue area into a first set of tiles of constant size and having a first image magnification and dividing the target organ tissue area into at least one second set of tiles of constant size and having a second image magnification different from the first image magnification, wherein dividing the target organ tissue area into the first set of tiles and the at least one second set of tiles comprises:

extracting a foreground mask of the target organ tissue area;

providing annotations classifying areas of the target organ tissue area; and merging the annotations with the foreground mask;

inputting the first set of tiles and the at least one second set of tiles into the convolutional neural network, wherein the convolutional neural network is an at least two-headed convolutional neural network in which the first set of tiles and the at least one second set of tiles are processed in parallel whereby features of the first set of tiles and the at least one second set of tiles are concatenated; and labelling output results of the convolutional neural network with respect to the target organ tissue type.

* * * * *